Aug. 17, 1954

A. H. WICKNICK 2,686,848

HANDSET CRADLING ATTACHMENT FOR TELEPHONES

Filed June 11, 1951

INVENTOR.
ARTHUR H. WICKNICK
BY
Cook & Robinson
ATTORNEYS

Patented Aug. 17, 1954

2,686,848

UNITED STATES PATENT OFFICE 2,686,848

HANDSET CRADLING ATTACHMENT FOR TELEPHONES

Arthur H. Wicknick, Seattle, Wash.

Application June 11, 1951, Serial No. 230,964

4 Claims. (Cl. 179—146)

This invention relates to attachments for telephones, and it has reference more particularly to attachments designed for application to telephones of desk set types as a means for an easier placement of the hand set in the stand cradles and as an assurance of that proper placement that is required to cause the depressing of switch buttons and the establishing of certain circuit conditions in the set or system when the telephone is not in use, that permits the incoming calls to be received.

It is the principal object of my invention to provide an attachment that can be easily and readily applied to the telephone without necessitating any alteration thereof; that is inexpensive to make and apply; that will effectively and efficiently serve the above mentioned purposes for which it is intended, and which adds greatly to the ease of rapid use of such telephones.

A further object of the invention is to provide an attachment which is useful for the purposes above recited and which, in addition, serves as a convenient and practical means for display of advertising or other information.

Still further objects reside in the details of construction of the present attachment and in its application to and combination with the telephone.

In accomplishing these and other objects of the invention, I have provided the improved details of construction, the preferred forms of which are illustrated in the accompanying drawings, wherein—

Figures 1, 2, 3, 4:
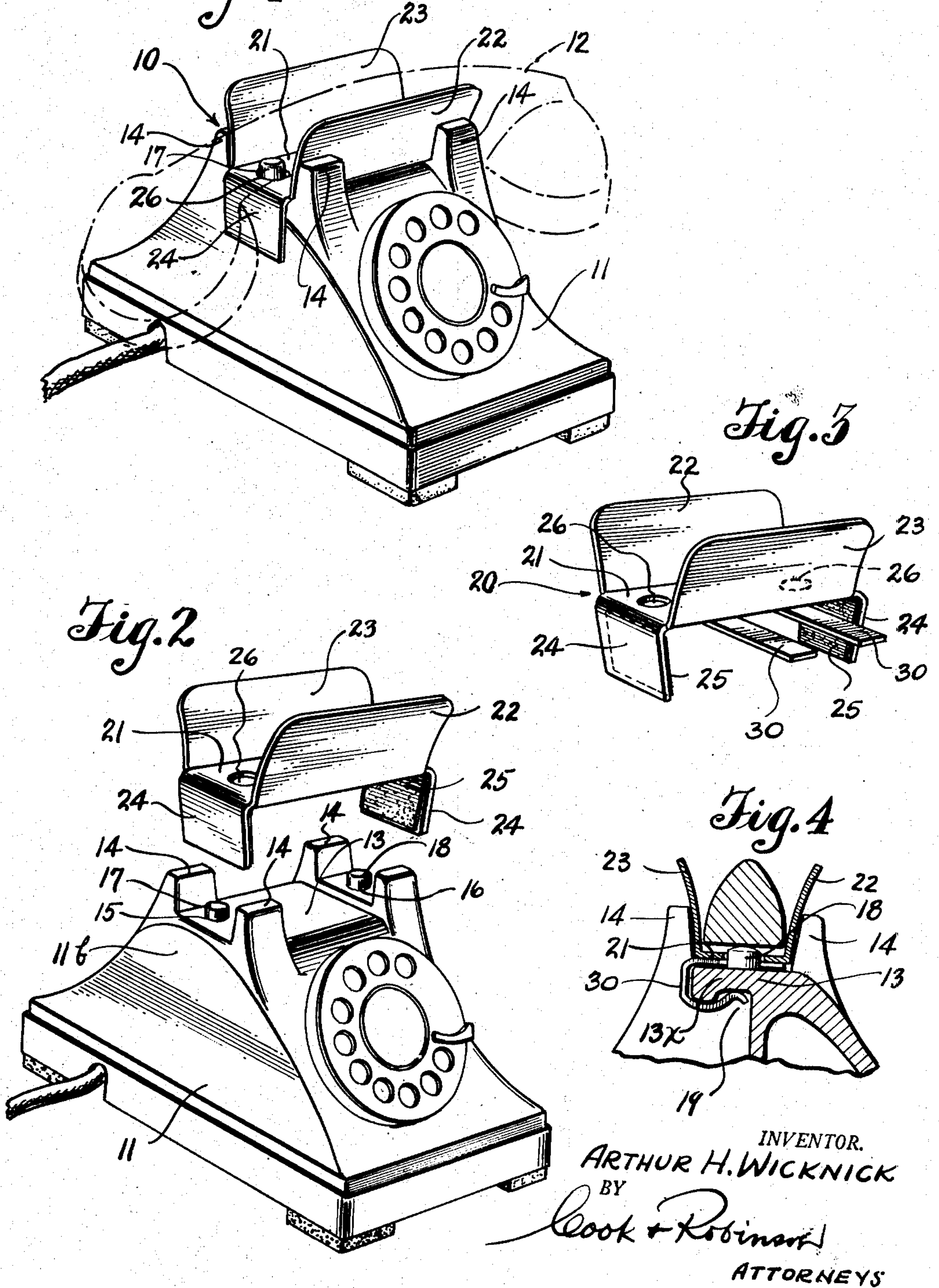
Fig. 1 is a perspective view of a conventional desk type telephone to which the device of the present invention has been applied; the hand-set of the telephone being shown in broken lines and disposed in the cradle comprised by the present device.
Fig. 2 is a perspective view of a conventional desk type, telephone stand, as seen from the front, and a device comprising my invention prior to its being applied to the telephone.
Fig. 3 is a perspective view, showing the back side of the attachment device which comprises my invention.
Fig. 4 is a sectional detail of the attachment as applied to the telephone, the section being in a vertical plane, through the upper portion of the telephone stand.

It often occurs from the rush of business or carelessness, that the hand-set portion of a telephone is not properly placed in the cradles of the stand, and hence does not depress the switch buttons and break the telephone circuit connection as required for use of the system. If the buttons are not properly and completely depressed, the line remains "busy" and it is impossible to receive incoming calls on that particular line. The application of the present attachment to the telephone stand, as has been illustrated in Fig. 1, assures the accurate placement of the hand-set, on the stand, even by the careless user to positively cause the establishment of necessary circuit conditions or to open the line for incoming calls until the hand-set is again lifted.

In Fig. 1, I have illustrated a conventional desk type telephone, designated in its entirety by reference numeral 10. This type of telephone comprises a stand, or base 11 and a hand set 12. The base is formed on the uppermost part thereof, with a cradle for receiving and supporting the hand-set 12 therein when not in use. The cradle comprises a horizontal wall portion 13, across the top of the stand, which is formed, adjacent opposite sides of the stand with upstanding posts 14—14 to receive and retain the hand-set in proper position between them.

In the base wall of the cradle, at the opposite ends thereof are holes 15 and 16 through which project the switch buttons 17 and 18. These buttons are adapted to be depressed by placement of the hand-set to open or close certain electrical circuits necessary to the operation of the telephone. As noted in Fig. 4, the base wall 13 forms a rearwardly directed ledge 13x beneath which is a rearwardly facing cavity or recess 19.

The attachment device comprising my invention is designated in its entirety in Fig. 3 by reference numeral 20 and it is of channel form and includes a horizontal bottom wall 21, to the opposite longitudinal edges of which are attached, these walls being somewhat outwardly and upwardly diverging as shown in Fig. 4. At the opposite ends of the bottom wall 21, I provide downwardly projecting clips or flanges 24—24 which extend substantially at right angle to the bottom. Secured to the inner surfaces of the clips are pads 25—25 of adhesive material. If desired or required, the clips may be directed inwardly toward each other, as will hereinafter be more fully described.

In the bottom wall 21 of the device, holes 26—26 are provided and longitudinally spaced apart. The holes are of sufficient diameter and so located as to permit the switch buttons 17 and 18 to freely pass upwardly therethrough with adequate clearance when the device is applied to the telephone.

Secured to the under surface of the bottom section 21 are a pair of spaced apart clips 30—30 which extend outwardly therefrom beyond the back wall 22. The position and function of these clips are illustrated in Figs. 3 and 4. The clips are formed of metal or other semi-rigid material which is adapted and capable of being bent as shown in Fig. 4, and their purpose is to hold the device in firm position in the stand cradles. Prior to the application of the device 20 to the base 11, the clips 30 project horizontally as illustrated in Fig. 3 and when the device has been seated in place, the clips are bent downwardly and forwardly as illustrated in Fig. 4 to extend into the cavity 19 and holdingly engage with the under side of the ledge 13*x*.

A telephone attachment device so formed is adapted to be disposed transversely of the stand between the paired posts 14—14 as illustrated in Fig. 1 of the drawings. When so disposed and secured, the hand-set 12 may be rested therein between the diverging walls 22 and 23. The attachment may be quickly and easily applied to the base or stand 11 by first removing the hand-set 12 from the stand. The flanges 24—24 of the device are spread apart sufficiently to permit clearance of the opposite side walls 11*b* of the base. When the device is properly applied to the telephone base, the adhesive surfaces of the flanges 24—24 firmly grip its side walls and the switch buttons 17 and 18 project upwardly through the holes 26—26 in the bottom wall 13. Thus, when the hand-set is not in use, it may be held in the device, longitudinally thereof and between the front and back walls, as indicated in Fig. 4. When so placed, the switch buttons will be depressed, thereby establishing necessary circuit conditions that another call can be received.

With my telephone attachment device so constructed and applied to a telephone, a novel and practical cradle is provided for readily receiving the hand-set and causing it to automatically be properly seated to depress the switch buttons. This results from the substantially higher, and diverging front and back walls. The hand-set cannot remain in a "cocked" or improper position such as resting upon one of the posts 14. A complete disconnection of the telephone circuit is assured.

The material from which the device is made may be metal, plastic, rubber or other satisfactory substance. It may be stamped or molded as desired and depending upon the material used. It is necessary, however, the clips 30—30 be made of material which is capable of being bent or hooked as previously described and illustrated.

The spacious surfaces provided by the walls 22 and 23 of the cradle are well adapted for the display of advertising matter telephone numbers of advertisers. Hence, besides its use as a holder for the hand set, it also has great utility for display of advertising.

Though I have illustrated and described my invention as applied to a particular type or style of telephone set, it is not to be construed as limited thereto. A slightly modified form of device may be used on the telephone sets or other devices which employ a cradle to receive and support the hand-set.

Having thus described my invention, what I claim as new therein and desire to secure by Letters-Patent, is:

1. An attachment for a desk type telephone to be seated at its opposite ends within the laterally spaced cradle as provided on the telephone housing; said attachment comprising a channel-like cradle for receiving and holding the hand set of the telephone therein, and the attachment including a flat bottom portion and opposite side wall portions, an opening through the bottom of the attachment for the free passage therethrough of the switch button of the telephone.

2. An attachment for a desk type telephone to be seated at its opposite ends within the laterally spaced cradle as provided on the telephone housing; said attachment comprising a channel-like cradle for receiving and holding the hand set of the telephone therein, and said cradle attachment having a flat bottom portion with openings therethrough for the passage of the switch button of the telephone for depression by the handset when disposed in said cradle attachment, and flanges at opposite ends of said cradle attachment adapted to holdingly engage with the sidewall of the telephone housing to prevent displacement of the cradle attachment from the telephone.

3. A telephone attachment device as in claim 2 wherein said cradle comprises a flat horizontal bottom, and upwardly directed and diverging opposite sidewalls of substantial height.

4. A telephone attachment device as in claim 2 wherein clips are fixed to the bottom of the cradle attachment and said clips extend rearwardly and are adapted to be bent into holding contact with the telephone housing.

References Cited in the file of this patent

UNITED STATES PATENTS

| Number | Name | Date |
|---|---|---|
| 1,894,016 | Blount | Jan. 10, 1933 |
| 1,917,724 | Kuaal | July 11, 1933 |
| 2,320,838 | Watson | June 1, 1943 |
| 2,541,712 | Neblett | Feb. 13, 1951 |

FOREIGN PATENTS

| Number | Country | Date |
|---|---|---|
| 266,716 | Great Britain | Nov. 10, 1927 |